United States Patent
Murphy et al.

(10) Patent No.: US 9,031,529 B2
(45) Date of Patent: *May 12, 2015

(54) METHOD AND SYSTEM FOR LOW-NOISE, HIGHLY-LINEAR RECEIVER FRONT-END

(71) Applicant: Broadcom Corporation, Irvine, CA (US)

(72) Inventors: David Murphy, Costa Mesa, CA (US); Ahmad Mirzaei, San Diego, CA (US); Mohyee Mikhemar, Irvine, CA (US); Hooman Darabi, Laguna Niguel, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/863,057

(22) Filed: Apr. 15, 2013

(65) Prior Publication Data
US 2014/0057584 A1 Feb. 27, 2014

Related U.S. Application Data

(63) Continuation of application No. 13/050,570, filed on Mar. 17, 2011, now Pat. No. 8,422,979.

(51) Int. Cl.
*H04B 1/26* (2006.01)
*H04B 1/16* (2006.01)
*H04B 1/30* (2006.01)

(52) U.S. Cl.
CPC ... *H04B 1/16* (2013.01); *H04B 1/30* (2013.01)

(58) Field of Classification Search
USPC ........... 455/130, 232.1, 234.1, 254, 280, 323, 455/324, 326, 330, 333, 340, 341
See application file for complete search history.

(56) References Cited

U.S. PATENT DOCUMENTS

| | | | |
|---|---|---|---|
| 8,422,979 B2 | 4/2013 | Murphy et al. | |
| 2006/0068746 A1* | 3/2006 | Feng et al. | 455/323 |
| 2008/0014896 A1* | 1/2008 | Zhuo et al. | 455/326 |
| 2008/0132189 A1 | 6/2008 | Maxim et al. | |
| 2008/0139162 A1 | 6/2008 | Hafizi | |
| 2012/0021699 A1 | 1/2012 | Mikhemar et al. | |
| 2012/0077446 A1 | 3/2012 | Kahrizi et al. | |

* cited by examiner

*Primary Examiner* — Thanh Le
(74) *Attorney, Agent, or Firm* — Sterne, Kessler, Goldstein & Fox P.L.L.C.

(57) ABSTRACT

Aspects of a method and system for a low-noise, highly-linear receiver front-end are provided. In this regard, a received signal may be processed via one or more transconductances, one or more transimpedance amplifiers (TIAs), and one or more mixers to generate a first baseband signal corresponding to a voltage at a node of the receiver, and a second baseband signal corresponding to a current at the node of the receiver. The first signal and the second signal may be processed to recover information from the received signal. The first signal may be generated via a first one or more signal paths of the receiver and the second signal may be generated via a second one or more signal paths of the receiver.

6 Claims, 10 Drawing Sheets

METHOD AND SYSTEM FOR LOW-NOISE, HIGHLY-LINEAR RECEIVER FRONT-END

FIELD OF THE INVENTION

Certain embodiments of the invention relate to wireless communications. More specifically, certain embodiments of the invention relate to a method and system for low-noise, highly-linear receiver front-end.

BACKGROUND OF THE INVENTION

As the number of wireless standards and the range of frequencies of wireless communications continue to increase, there is increasing need for communication receivers that are capable of handling multiple wireless standards spanning a wide range of frequencies. Also, as the number of wireless devices and the amount of wireless communications taking place increase, these communication receivers have to function satisfactorily in the presence of large amounts of noise and interference.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for a low-noise, highly-linear receiver front-end, substantially as illustrated by and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1:
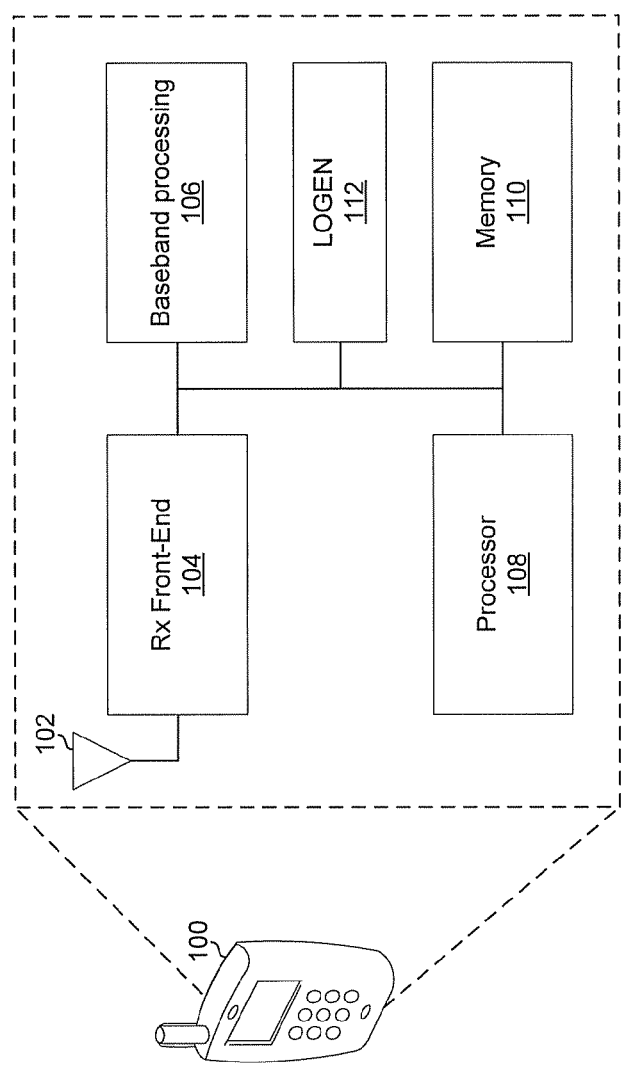
FIG. 1 is a block diagram illustrating an exemplary wireless communication device, in accordance with an embodiment of the invention.

Certain embodiments of the invention may be found in a method and system for low-noise, highly-linear receiver front-end. In various embodiments of the invention, a received signal may be processed via one or more transconductances, one or more transimpedance amplifiers (TIAs), and one or more mixers to generate a first baseband signal corresponding to a voltage at a node of the receiver, and a second baseband signal corresponding to a current at the node of the receiver. The first signal and the second signal may be processed to recover information from the received signal. The first signal may be generated via a first signal path of the receiver and the second signal may be generated via a second signal path of the receiver.

The first signal path may comprise the one or more transconductances, at least a portion of the one or more mixers, and at least a portion of the one or more TIAs. The second signal path may comprise at least a portion of the one or more mixers and at least a portion of the one or more TIAs. The received signal at the node may be input to the one or more transconductances. An output of the one or more transconductances may be input to the portion of the one or more mixers in the first signal path. An output of each of the at least a portion of the one or more mixers of the first signal path may be input to the portion of the one or more transimpedance amplifiers in the first signal path. The received signal at the node of the receiver may be input to the portion of the one or more mixers in the second signal path. An output of each of the portion of the one or more mixers in the second signal path may be input to the portion of the one or more transimpedance amplifiers in the second signal path.

The first signal path may comprise a first capacitor, at least a portion of the one or more mixers and the one or more transconductances. The second signal path may comprise a second capacitor, at least a portion of the one or more mixers, and the one or more TIAs. The received signal at the node of the receiver may be coupled to a first terminal of the first capacitor. A second terminal of the first capacitor may be coupled to an input of the portion of the one or more mixers in the first signal path. An output of each of the portion of the one or more mixers in the first signal path may be input to the one or more transconductances. The received signal at the node of the receiver may be coupled to a first terminal of the second capacitor. A second terminal of the second capacitor may be coupled to an input of the portion of the one or more mixers in the second signal path. An output of each of the portion of the one or more mixers in the second signal path may be input to the one or more TIAs.

The first signal path may comprise a first portion of the one or more transconductances, a first portion of the one or more mixers, and a first portion of the one or more TIAs. The second signal path may comprise a second portion of the one or more transconductances, a second portion of the one or more mixers, and a second portion of the one or more TIAs. An architecture of the first portion of the one or more transconductances may be different than an architecture of the second portion of the one or more transconductances. The received signal at the node of the receiver may be input to each of the one or more transconductances. An output of each of the transconductances may be input to the one or more mixers. An output of each of the one or more mixers may be input to the one or more TIAs.

The received signal at the node may be input to the one or more mixers. An output of each of the one or more mixers may be input to the one or more transconductances. An output of each of the one or more mixers may be input to a first portion of the one or more TIAs. An output of each of the transconductances may be input to a second portion of the one or more TIAs.

FIG. 1 is a block diagram illustrating an exemplary wireless communication device, in accordance with an embodiment of the invention. Referring to FIG. 1, the wireless communication device 100 may comprise an antenna 102, a receiver front-end 104, a baseband processing module 106, a processor 108, a memory 110, and a local oscillator generator 112. In various embodiments of the invention, one or more of the blocks represented in FIG. 1 may be integrated on one or more semiconductor substrates. For example, the blocks 104-112 may be realized in a single system on chip, or may be realized in a multi-chip chipset.

The antenna 102 may be suitable for transmitting and/or receiving wireless signals over a wide range of frequencies. Although a single antenna 102 is illustrated, the invention is not so limited.

The receiver front-end 104 may comprise suitable logic circuitry and/or code that may be operable to receive and process signals from the antenna 102. The receiver front end 104 may, for example, be operable to amplify and/or down-covert received wireless signals. In various embodiments of the invention, the receiver front-end 104 may be operable to cancel noise in received signals and may be linear over a wide range of frequencies. In this manner, the front-end 104 may be suitable for receiving signals in accordance with a variety of wireless standards. Exemplary standards which the front-end 104 may be suitable for receiving include Wi-Fi, WiMAX, Bluetooth, and various cellular standards. In various embodiments of the invention, the front-end may not require any SAW filters and few or no off-chip discrete components such as large capacitors and inductors.

The baseband processing module 106 may comprise suitable logic, circuitry, interfaces, and/or code that may be operable to perform processing of baseband signals. The baseband processing module 106 may, for example, analyze received signals and generate control and/or feedback signals for configuring various components of the wireless communication device 104 such as the front-end. The baseband processing module 106 may be operable to encode, decode, transcode, modulate, demodulate, encrypt, decrypt, scramble, descramble, and/or otherwise process data in accordance with one or more wireless standards.

The processor 108 may comprise suitable logic, circuitry, and/or code that may enable processing data and/or controlling operations of the wireless communication device 100. In this regard, the processor 108 may be enabled to provide control signals to various other portions of the wireless communication device 100. The processor 108 may also control transfers of data between various portions of the wireless communication device 100. Additionally, the processor 108 may enable implementation of an operating system or otherwise execute code to manage operations of the wireless communication device 100.

The memory 110 may comprise suitable logic, circuitry, and/or code that may enable storage of various types of information such as received data, generated data, code, and/or configuration information. The memory 110 may comprise, for example, RAM, ROM, flash, and/or magnetic storage. In various embodiment of the invention, Information stored in the memory 110 may be utilized for configuring the front-end 104 and/or the baseband processing module 106.

The local oscillator generator (LOGEN) 112 may comprise suitable logic, circuitry, interfaces, and/or code that may be operable to generate one or more oscillating signals of one or more frequencies. The LOGEN 112 may be operable to generate digital and/or analog signals. In this manner, the LOGEN 112 may be operable to generate one or more clock signals and/or sinusoidal signals. Characteristics of the oscillating signals such as the frequency and duty cycle may be determined based on one or more control signals from, for example, the processor 108 and/or the baseband processing module 106.

In operation, the processor 108 may configure the various components of the wireless communication device 100 based on a wireless standard according to which it is desired to receive signals. Wireless signals may be received via the antenna 102 and amplified and down-converted by the front-end 104. The baseband processing module 106 may perform noise estimation and/or noise cancellation, decoding, and/or demodulation of the baseband signals. In this manner, information in the received signal may be recovered and utilized appropriately. For example, the information may be audio and/or video to be presented to a user of the wireless communication device, data to be stored to the memory 110, and/or information affecting and/or enabling operation of the wireless communication device 100.

Figure 2:
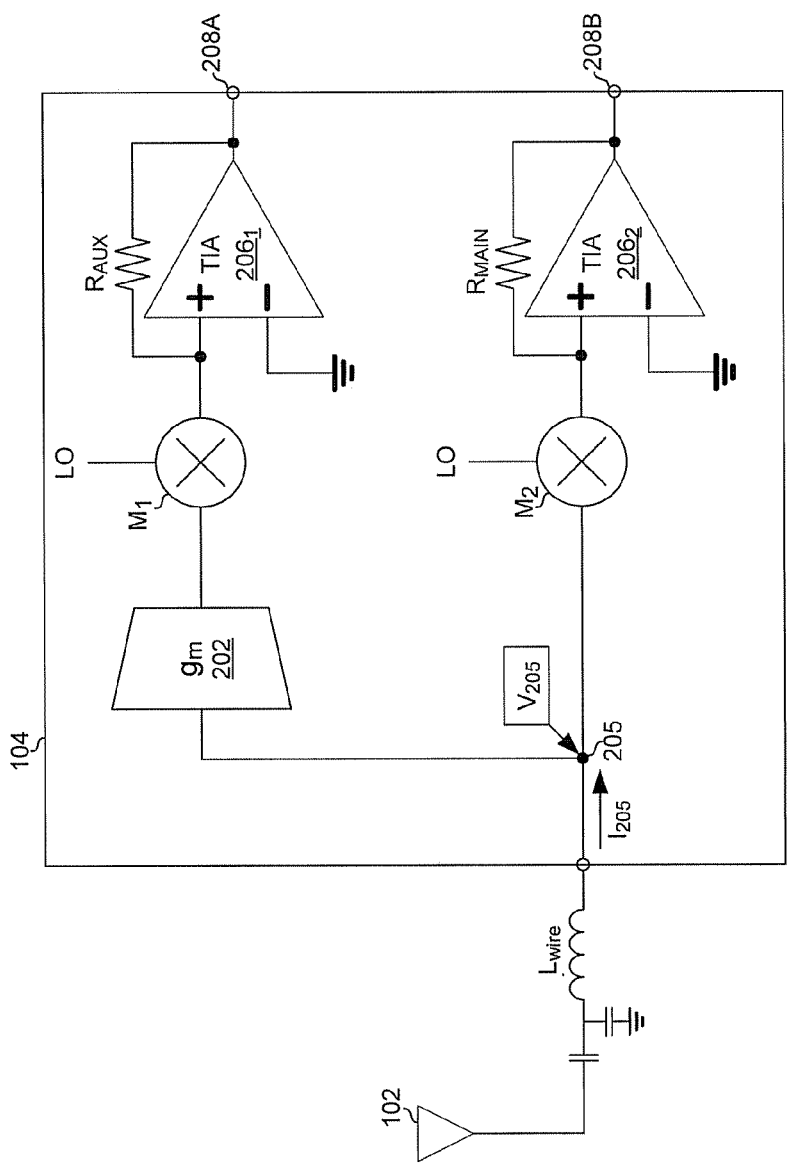
FIG. 2 is a high-level block diagram of an exemplary receiver front end, in accordance with an embodiment of the invention.

FIG. 2 is a high-level block diagram of an exemplary receiver front end, in accordance with an embodiment of the invention. Referring to FIG. 2, the exemplary front-end 104 comprises a transconductance 202, mixers $M_1$ and $M_2$, transimpedance amplifiers $206_1$ and $206_2$, Resistors $R_{AUX}$ and $R_{MAIN}$, and a harmonic recombination module 208.

The transconductance 202 may comprise suitable logic, circuitry, interfaces, and/or code that may be operable to output a current that is proportional to a voltage input to the transconductance 202. The factor of proportionality may be $g_M$.

The mixers $M_1$ and $M_2$ may each comprise suitable logic, circuitry, and/or code that may enable generation of intermodulation products resulting from mixing the received signal at node 205 with one or more LO signals generated by LOGEN 112 (FIG. 1).

The transimpedance amplifier (TIA) $206_1$ may comprise suitable logic, circuitry, interfaces, and/or code that may be operable to output a voltage that is proportional to a current input to the TIA $206_1$. Similarly, the TIA $206_2$ may comprise suitable logic, circuitry, interfaces, and/or code that may be operable to output a voltage that is proportional to a current input to the TIA $206_2$.

In operation, a signal may be received via the antenna 102 and conveyed to the node 205 via a signal trace and/or wire represented as an inductance $L_{wire}$. The received signal at node 205 may be input to a first signal path comprising the transconductance 202, the mixer $M_1$, and the TIA $206_1$, and to a second signal path comprising the mixer $M_2$ and the TIA $206_2$. The first signal path may generate, at port 208A, a baseband signal corresponding to a voltage, $V_{205}$, at the node 205. The second signal path may generate, at port 208B, a baseband signal corresponding to a current, $I_{205}$, at the node 205. The signal at port 208A and 208B may be processed by the baseband processing module 106 (FIG. 1) to suppress and/or cancel noise and recover information from the received signal.

In an embodiment of the invention, one or more of $R_{AUX}$, $R_{MAIN}$, and $g_M$ may be preconfigured and/or dynamically configured during operation of the front-end 104 to maintain, within a tolerance, the following relationship:

$$g_M \cdot R_{AUX} = \frac{R_{MAIN}}{R_S}$$

Maintaining this relationship may minimize the noise figure of the front-end 104, if $g_M$, $R_{AUX}$, and $R_{MAIN}$ are sufficiently large.

Figure 3A:
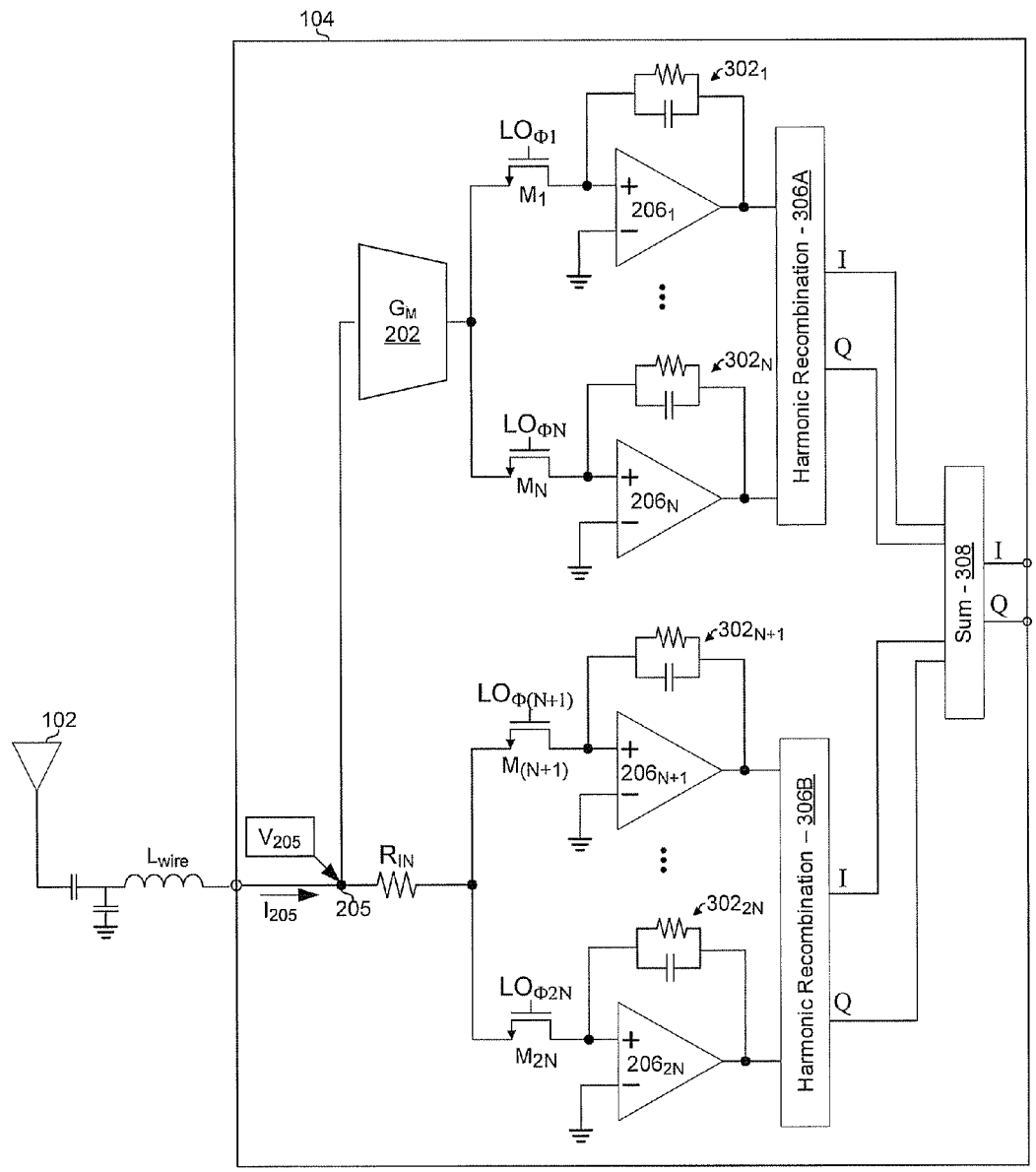
FIG. 3A is a block diagram illustrating an exemplary receiver front end, in accordance with an embodiment of the invention.

FIG. 3A is a block diagram illustrating an exemplary receiver front end, in accordance with an embodiment of the invention. Referring to FIG. 3A, the wireless communication device 104 may comprise the transconductance 202, a plurality of mixers $M_1$-$M_{2N}$, TIAs $206_1$-$206_{2N}$, feedback circuits $302_1$-$302_{2N}$, a resistor $R_{IN}$, harmonic recombination modules 306A and 306B, and a summer 308, where N may be any integer greater than or equal to 1. In various embodiments of the invention, N may be equal, for example, to 2, 4, or 8.

The transconductance 202 may be as described with respect to FIG. 2. Each of the TIAs $206_1$-$206_{2N}$ may be the same as the TIAs $206_1$ and $206_2$ described above with respect to FIG. 2. Each of the feedback circuits $302_1$-$302_{2N}$ may comprise one or more components, a capacitor and a resistor, for example, for setting a gain and/or frequency response of the corresponding one of the TIAs $206_1$-$206_{2N}$.

In an embodiment of the invention, the mixers $M_1$-$M_{2N}$ may each be a passive mixer and may comprise, for example, a single NMOS transistor. In an embodiment of the invention, a plurality, 2N, of LO signals, each being phase shifted with respect to the others, may be generated by the LOGEN 112 (FIG. 1). Each of the mixers may receive one the 2N LO signals. For example, for N=4, 8 LO signals corresponding to 8 phases may be generated and each may have a 12.5% duty-cycle such that only one of the 8 LO signals is in a logic-high state at any given time instant.

The harmonic recombination module 306A may comprise suitable logic, circuitry, interfaces, and/or code that may be operable to combine the N signals, corresponding to N phases, from the TIAs $206_1$-$206_N$ to generate a pair of phase-quadrature baseband signals corresponding to a voltage at node 205. Similarly, the harmonic recombination module 306B may comprise suitable logic, circuitry, interfaces, and/or code that may be operable to combine the N signals, corresponding to N phases, from the TIAs $206_{N+1}$-$206_{2N}$ to generate a pair of phase-quadrature baseband signals corresponding to a current at node 205.

The summer 308 may comprise suitable logic, circuitry, interfaces, and/or code that may be operable to combine, via, for example, addition, subtraction, and/or weighted addition or subtraction, two or more of the signals from the harmonic recombination modules 306A and 306B. For example, the in-phase signal from module 306A may be combined with the in-phase signal from module 306B to output an in-phase baseband signal, and the quadrature-phase signal from module 306A may be combined with the quadrature-phase signal from module 306B to output a quadrature-phase baseband signal.

The resistor $R_{IN}$ may be variable and/or optionally populated. In this regard, the resistor $R_{IN}$ may be populated and/or its resistance may be controlled based on predetermined values, and/or dynamically during operation of the front-end 104, to adjust the linearity of the front-end 104.

In operation, a signal may be received via the antenna 102 and conveyed to the node 205 via a signal trace and/or wire represented as an inductance $L_{wire}$. The received signal at node 205 may be processed via a first signal path comprising the mixers $M_1$-$M_N$, and TIAs $206_1$-$206_N$. Each of mixers $M_1$-$M_N$ may mix the output of the transconductance 202 with one of LO signals $LO_{\Phi 1}$-$LO_{\Phi N}$ to downconvert the received signal to baseband. The baseband output of each the mixers $M_1$-$M_N$ may be input to a corresponding one of TIAs $206_1$-$206_N$. Each of the TIAs $206_1$-$206_N$ may convert the current output of a corresponding one of the mixers $M_1$-$M_N$ to a corresponding voltage. There may be a gain associated with the current-to-voltage conversion. The harmonic recombination module 306A may combine the N signals from the TIAs $206_1$-$206_N$ to generate a pair of phase-quadrature baseband signals corresponding to a voltage on node 205.

The received signal at node 205 may also be processed via a second signal path comprising the mixers $M_{N+1}$-$M_{2N}$, and the TIAs $206_{N+1}$-$206_{2N}$. Each of mixers $M_{N+1}$-$M_{2N}$ may mix the signal at node 205 with one of LO signals $LO_{\Phi(N+1)}$-$LO_{\Phi 2N}$ to downconvert the received signal to baseband. The baseband output of each the mixers $M_{N+1}$-$M_{2N}$ may be input to a corresponding one of the TIAs $206_{N+1}$-$206_{2N}$. Each of the TIAs $206_{N+1}$-$206_{2N}$ may convert the current output of a corresponding one of the mixers $M_{N+1}$-$M_{2N}$ to a corresponding voltage. There may be a gain associated with the current-to-voltage conversion. The harmonic recombination module 306B may combine the N signals from the TIAs $206_{N+1}$-$206_{2N}$ to generate a pair of phase-quadrature baseband signals corresponding to a current on node 205.

The summer 308 may combine the pair of phase-quadrature baseband signals output by the module 306A and the pair of phase-quadrature baseband signals from module 306B to generate a single pair of phase-quadrature baseband signals. The output of summer 308 may be processed by baseband processing module 106 to recover information in the received signal.

Figure 3B:
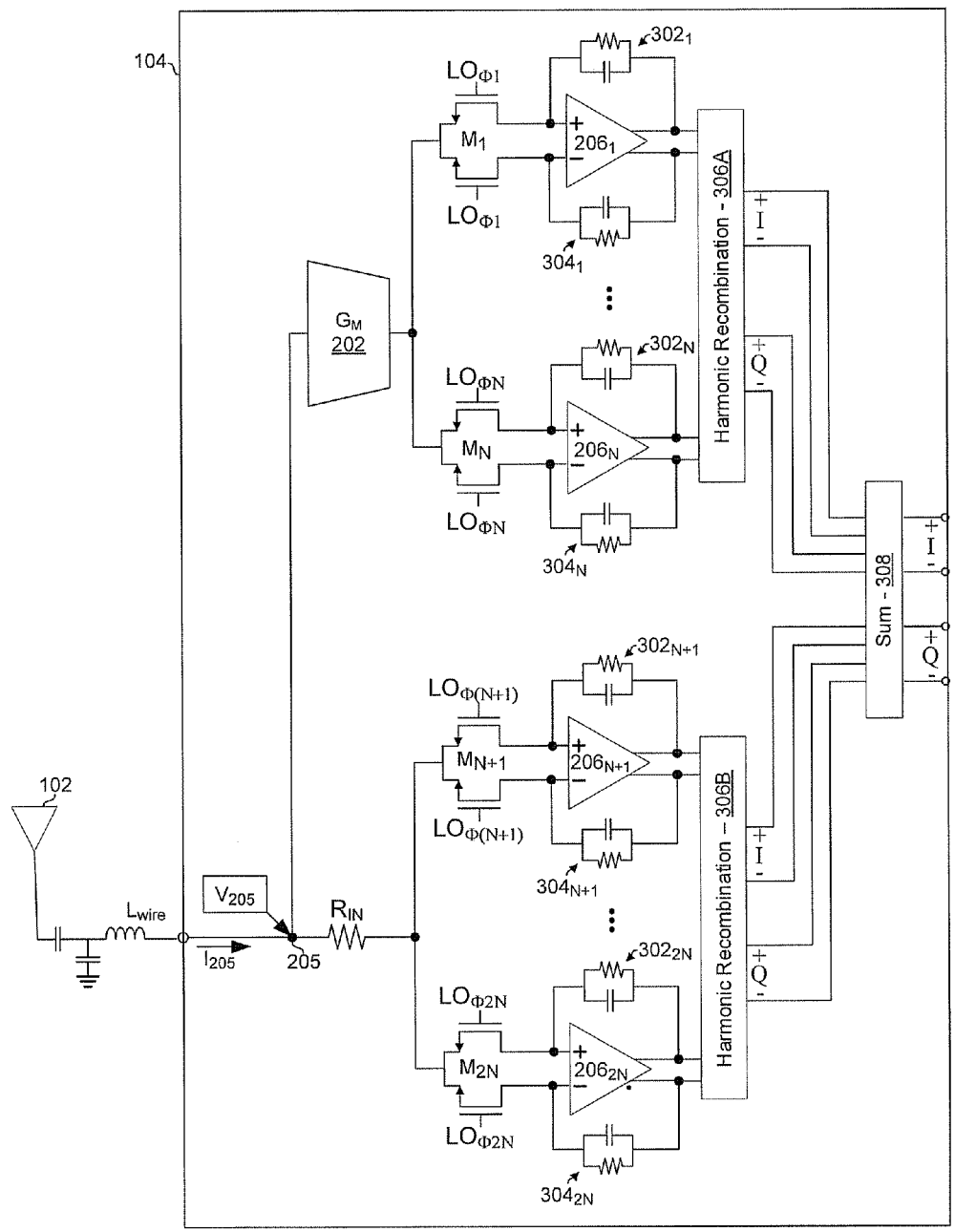
FIG. 3B is a block diagram illustrating an exemplary receiver front end, in accordance with an embodiment of the invention.

FIG. 3B is a block diagram illustrating an exemplary receiver front end, in accordance with an embodiment of the invention. The exemplary wireless communication device 104 shown in FIG. 3B is substantially similar to the one depicted in FIG. 3A with the exception that differential signaling is utilized downstream of the mixers $M_1$-$M_{2N}$.

Figure 3C:
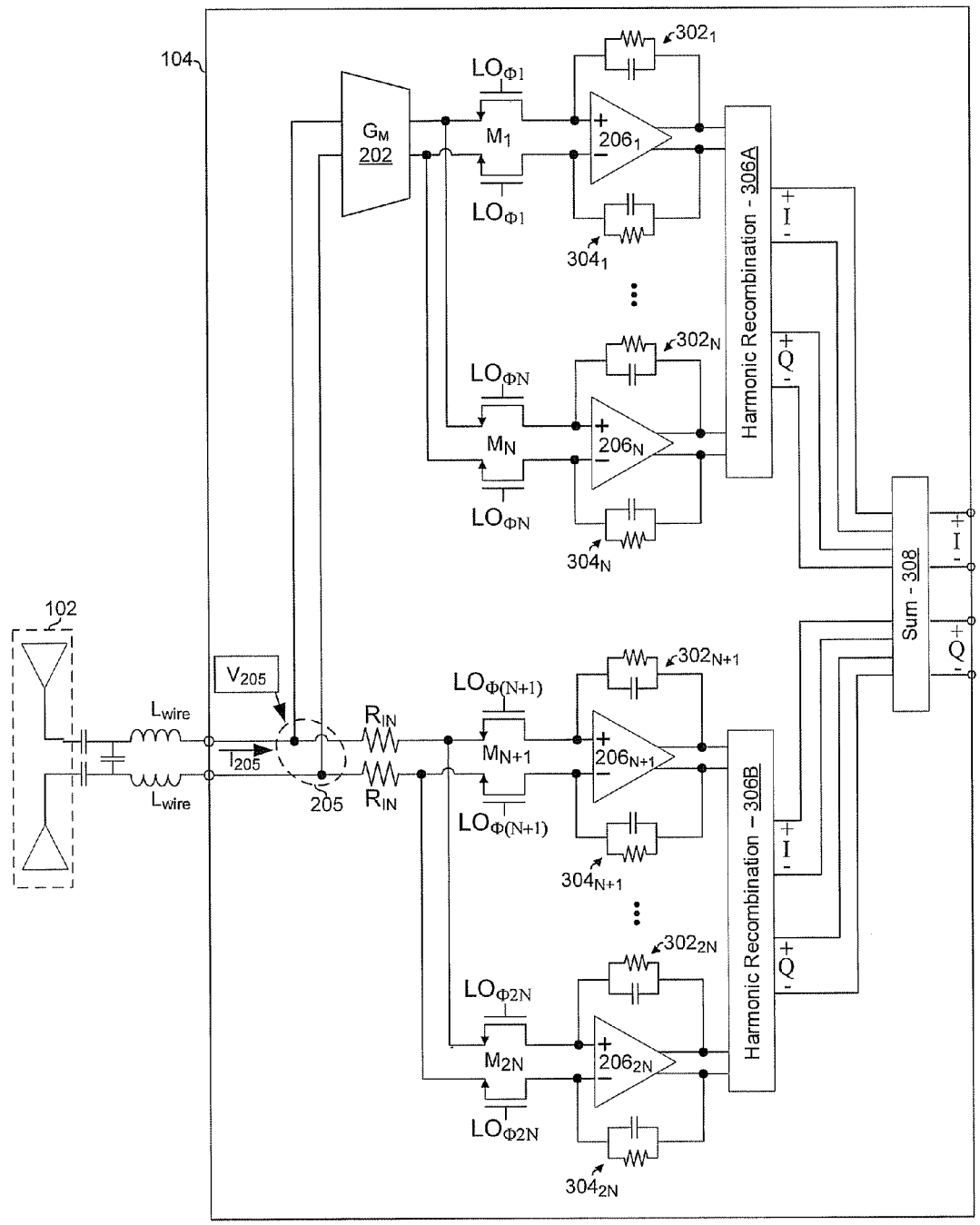
FIG. 3C is a block diagram illustrating an exemplary receiver front end, in accordance with an embodiment of the invention.

FIG. 3C is a block diagram illustrating an exemplary receiver front end, in accordance with an embodiment of the invention. The exemplary wireless communication device 104 shown in FIG. 3C is substantially similar to the one depicted in FIG. 3A with the exception that the front-end 104 in FIG. 3C is fully differential.

Figure 4:
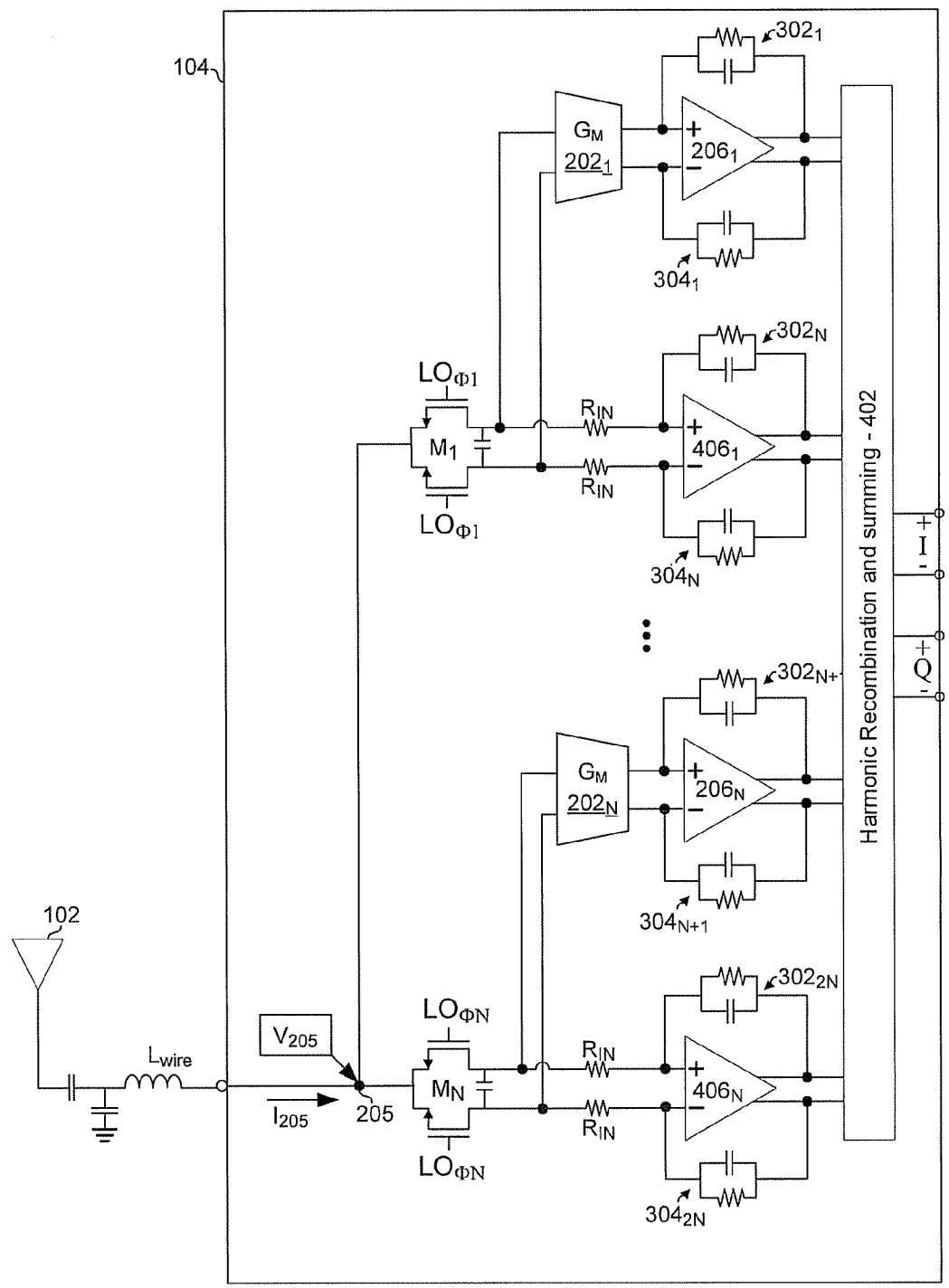
FIG. 4 is a block diagram illustrating an exemplary receiver front end, in accordance with an embodiment of the invention.

FIG. 4 is a block diagram illustrating an exemplary receiver front-end, in accordance with an embodiment of the invention. Referring to FIG. 4, the wireless communication device 104 may comprise a plurality of transconductances $202_1$-$202_N$, a plurality of mixers $M_1$-$M_N$, a plurality of TIAs $206_1$-$206_N$ and $406_1$-$406_N$, feedback circuits $302_1$-$302_{2N}$ and $304_1$-$304_{2N}$, resistors $R_{IN}$, harmonic recombination and summing module 502, where N may be any integer greater than or equal to 1. In various embodiments of the invention, N may be equal to, for example, 2, 4, or 8.

The transconductances $202_1$-$202_N$ may each be the same as the transconductance 202 described with respect to FIG. 2. Each of the TIAs $206_1$-$206_N$ and $406_1$-$406_N$ may be the same as the TIAs $206_1$ and $206_2$ described above with respect to FIG. 2. Each of the feedback circuits $302_1$-$302_{2N}$ and $304_1$-$304_{2N}$ may comprise one or more components, a capacitor and a resistor, for example, for setting a gain and/or frequency response of the corresponding one of the TIAs $206_1$-$206_N$ and $406_1$-$406_N$. The harmonic recombination and summing module 502 may perform the functions of the modules 306A, 306B, and 308 described above with respect to FIG. 3A. The resistors $R_{IN}$ may be as described above with respect to FIG. 3A.

In operation, a signal may be received via the antenna 102 and conveyed to the node 205 via a signal trace and/or wire represented as an inductance $L_{wire}$. The received signal at node 205 may be conveyed to each of mixers $M_1$-$M_N$. Each of the mixers $M_1$-$M_N$ may mix the signal at node 205 with one of LO signals $LO_{\Phi 1}$-$LO_{\Phi N}$ to generate a baseband signal. The baseband signal output by each of the mixers $M_1$-$M_N$ may be input to one of transconductances $202_1$-$202_N$. The output of each of the transconductances $202_1$-$202_N$ may be input to one of the TIAs $206_1$-$206_N$. The output of the TIAs $206_1$-$206_N$ may be combined by the module 402 to generate a first pair of phase-quadrature baseband signals corresponding to a voltage at node 205.

The baseband signal output by each of the mixers $M_1$-$M_N$ may be input to one of the TIAs $406_1$-$406_N$. The signals input to TIAs $406_1$-$406_N$ may each pass through resistors $R_{IN}$ in instances that resistors $R_{IN}$ are present. The output of the TIAs $406_1$-$406_N$ may be combined by the module 402 to generate a second pair of phase-quadrature baseband signals corresponding to the current at node 205.

The module 402 may combine the first pair of phase-quadrature baseband signals and the second pair of phase-quadrature baseband signals to generate a single pair of phase-quadrature baseband signals. The output of module 402 may be processed by baseband processing module 106 to recover information in the received signal.

Figure 5:
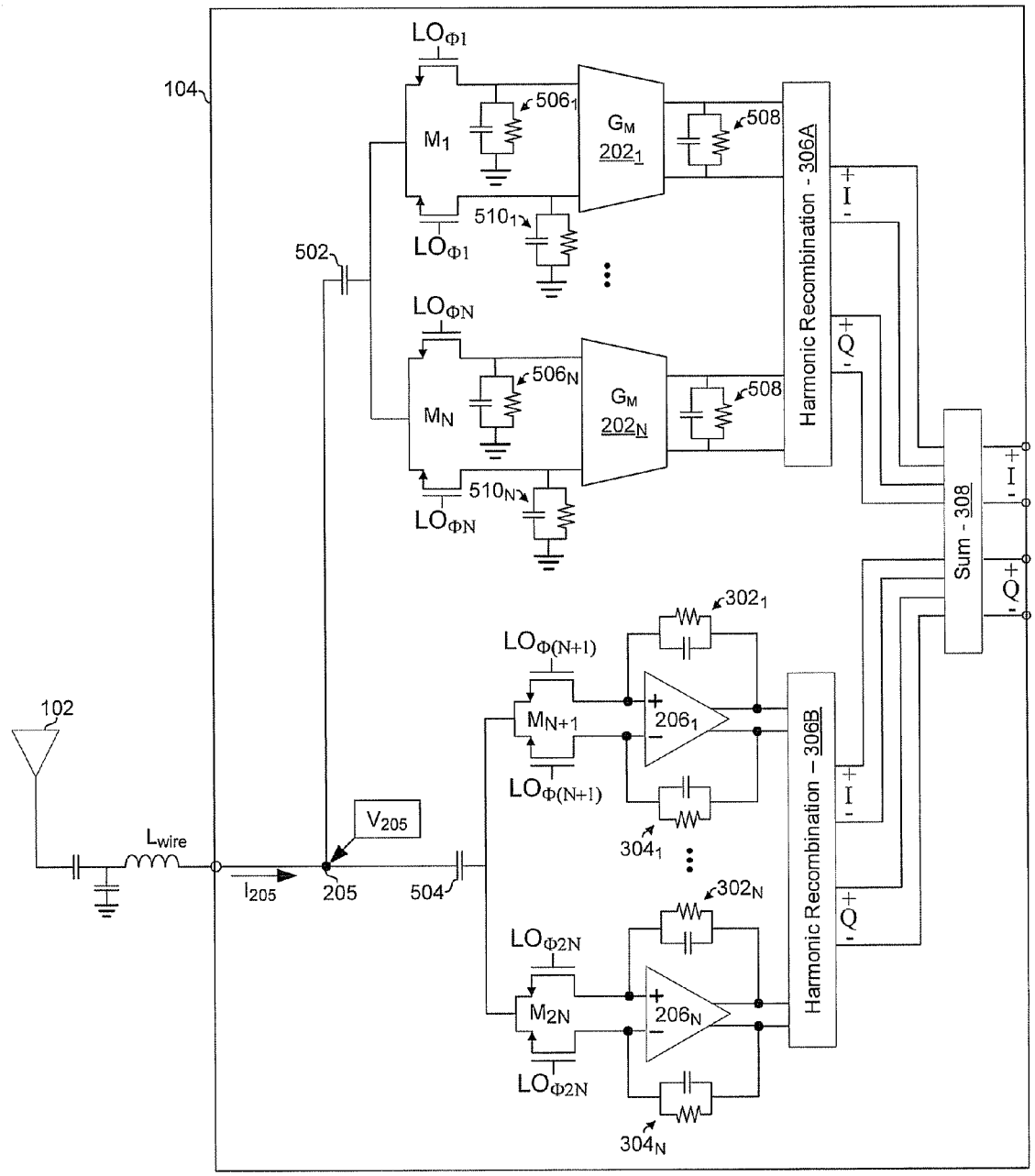
FIG. 5 is a block diagram illustrating an exemplary receiver front end, in accordance with an embodiment of the invention.

FIG. 5 is a block diagram illustrating an exemplary receiver front end, in accordance with an embodiment of the invention. Referring to FIG. 5, the wireless communication device 104 may comprise a plurality of transconductances $202_1$-$202_N$; filtering circuits $506_1$-$506_N$, $508_1$-$508_N$, and $510_1$-$510_N$; a plurality of mixers $M_1$-$M_{2N}$; a plurality of TIAs $206_1$-$206_N$; feedback circuits $302_1$-$302_N$ and $304_1$-$304_N$; capacitors 502 and 504; harmonic recombination modules 306A and 306B; and summer 308, where N may be any integer greater than or equal to 1. In various embodiments of the invention, N may be equal to, for example, 2, 4, or 8.

The transconductances $202_1$-$202_N$ may each be the same as the transconductance 202 described with respect to FIG. 2. Each of the TIAs $206_1$-$206_N$ may be the same as the TIAs $206_1$ and $206_2$ described above with respect to FIG. 2. Each of the feedback circuits $302_1$-$302_N$ and $304_1$-$304_N$ may be as described above with respect to FIG. 4. Each of the modules 306A and 306B may be as described above with respect to FIG. 3A. The summer 308 may be as described above with respect to FIG. 3A. The filtering circuits $506_1$-$506_N$, $508_1$-$508_N$, and $510_1$-$510_N$ may each comprise, for example, a resistor and a capacitor to filter undesired frequencies and/or set a frequency response of the front-end 104.

In operation, a signal may be received via the antenna 102 and conveyed to the node 205 via a signal trace and/or wire represented as an inductance $L_{wire}$. The received signal at node 205 may be conveyed to each of mixers $M_1$-$M_{2N}$ via one of capacitors 502 and 504. Each of the mixers $M_1$-$M_{2N}$ may mix the received RF signal with one of LO signals $LO_{\Phi 1}$-$LO_{\Phi N}$ to generate a corresponding baseband signal. The baseband signal output by each of the mixers $M_1$-$M_N$ may be input to one of transconductances $202_1$-$202_N$. The outputs of the transconductances $202_1$-$202_N$ may be combined by the harmonic recombination module 306A to generate a pair of phase-quadrature baseband signals corresponding to a voltage at node 205.

The baseband signal output by each of the mixers $M_{N+1}$-$M_{2N}$ may be input to one of the TIAs $206_1$-$206_N$. The output of the TIA's $206_1$-$206_N$ may be combined by the harmonic recombination module 306B to generate a pair of phase-quadrature baseband signals corresponding to the current at node 205.

The summer 308 may combine the pair of phase-quadrature baseband signals output by the module 306A and the pair of phase-quadrature baseband signals from module 306B to generate a single pair of phase-quadrature baseband signals. The output of summer 308 may be processed by baseband processing module 106 to recover information in the received signal.

Figure 6A:
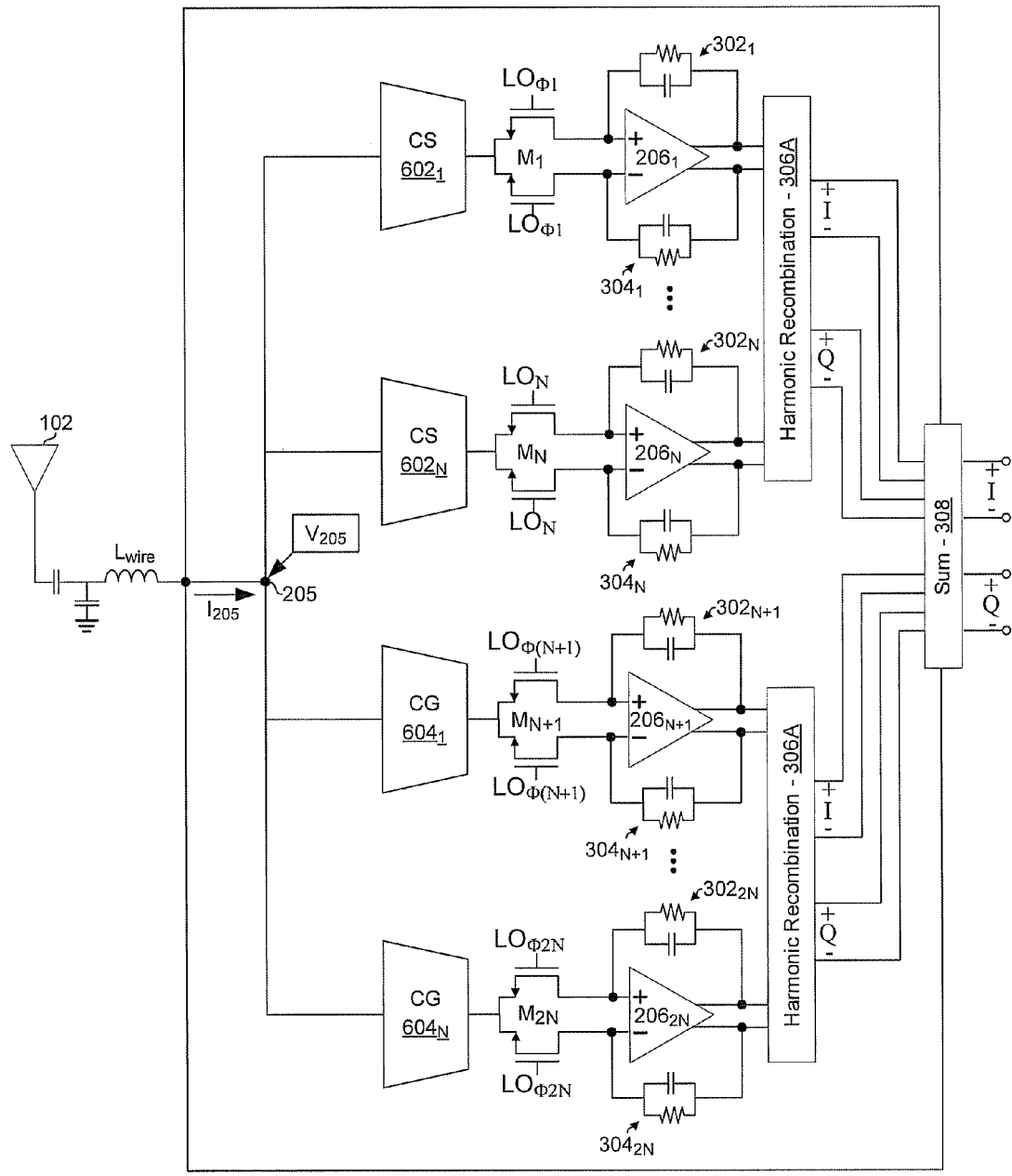
FIG. 6A is a block diagram illustrating an exemplary receiver front end, in accordance with an embodiment of the invention.

FIG. 6A is a block diagram illustrating an exemplary receiver front end, in accordance with an embodiment of the invention. Referring to FIG. 6A, the wireless communication device 104 may comprise a plurality of transconductances $602_1$-$602_N$ and $604_1$-$604_N$, a plurality of mixers $M_1$-$M_{2N}$, a plurality of TIAs $206_1$-$206_{2N}$, feedback circuits $302_1$-$302_{2N}$ and $304_1$-$304_{2N}$, harmonic recombination modules 306A and 306B, and summer 308, where N may be any integer greater than or equal to 1. In various embodiments of the invention, N may be equal to, for example, 2, 4, or 8.

Figure 6B:
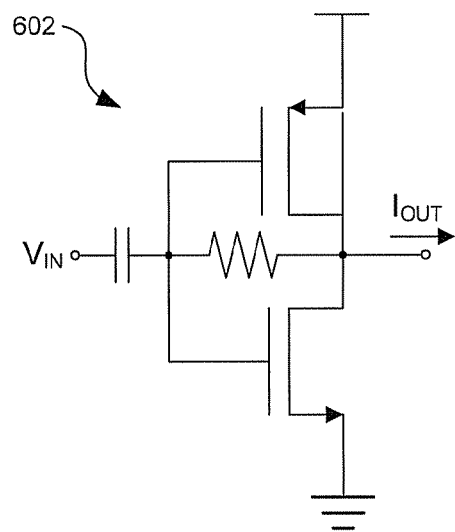
FIG. 6B is a diagram illustrating an exemplary transconductance, in accordance with an embodiment of the invention.
Figure 6C:
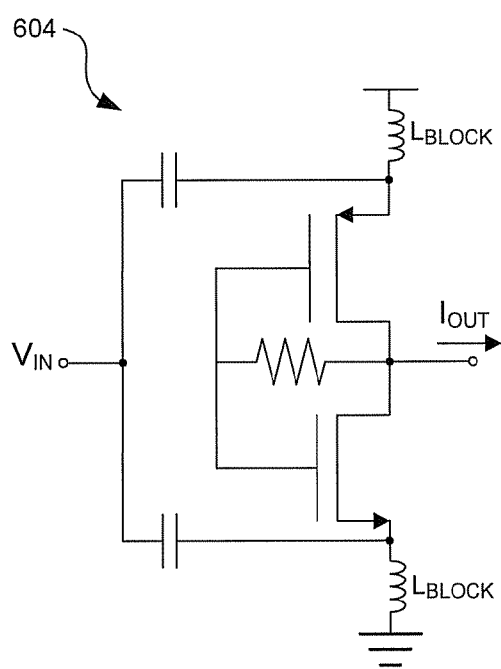
FIG. 6C is a diagram illustrating exemplary transconductances, in accordance with an embodiment of the invention.

The transconductances $602_1$-$602_N$ and $604_1$-$604_N$ may each be the same as the transconductance 202 described with respect to FIG. 2. In an exemplary embodiment of the invention, the architecture of each of the transconductances $602_1$-$602_N$ may be as shown in FIG. 6B, and the architecture of each of the transconductances $604_1$-$604_N$ may be as shown in FIG. 6C.

Each of the TIAs $206_1$-$206_{2N}$ may be the same as the TIAs $206_1$ and $206_2$ described above with respect to FIG. 2. Each of the feedback circuits $302_1$-$302_{2N}$ and $304_1$-$304_{2N}$ may be as described above with respect to FIG. 4. Each of the modules 306A and 306B may be as described above with respect to FIG. 3A. The summer 308 may be as described above with respect to FIG. 3A.

In operation, a signal may be received via the antenna 102 and conveyed to the node 205 via a signal trace and/or wire represented as an inductance $L_{wire}$. The received signal at node 205 may conveyed to each of the transconductances $602_1$-$602_N$ and $604_1$-$604_N$. The output of each of the transconductances $602_1$-$602_N$ and $604_1$-$604_N$ may be input to a corresponding one of the mixers $M_1$-$M_{2N}$. Each of the mixers $M_1$-$M_{2N}$ may mix the signal from the corresponding one of the transconductances $602_1$-$602_N$ and $604_1$-$604_N$ with one of LO signals $LO_{\Phi 1}$-$LO_{\Phi 2N}$ to generate a corresponding baseband signal. The baseband signal output by each of the mixers $M_1$-$M_{2N}$ may be input to one of TIAs $206_1$-$206_{2N}$. The outputs of the TIAs $206_1$-$206_N$ may be combined by the harmonic recombination module 306A to generate a pair of phase-quadrature baseband signals corresponding to a voltage at node 205. The outputs of the TIAs $206_{N+1}$-$206_{2N}$ may be combined by the harmonic recombination module 306B to generate a pair of phase-quadrature baseband signals corresponding to a current at node 205.

The summer 308 may combine the pair of phase-quadrature baseband signals output by the module 306A and the pair of phase-quadrature baseband signals from module 306B to generate a single pair of phase-quadrature baseband signals. The output of summer 308 may be processed by baseband processing module 106 to recover information in the received signal.

Figure 7:
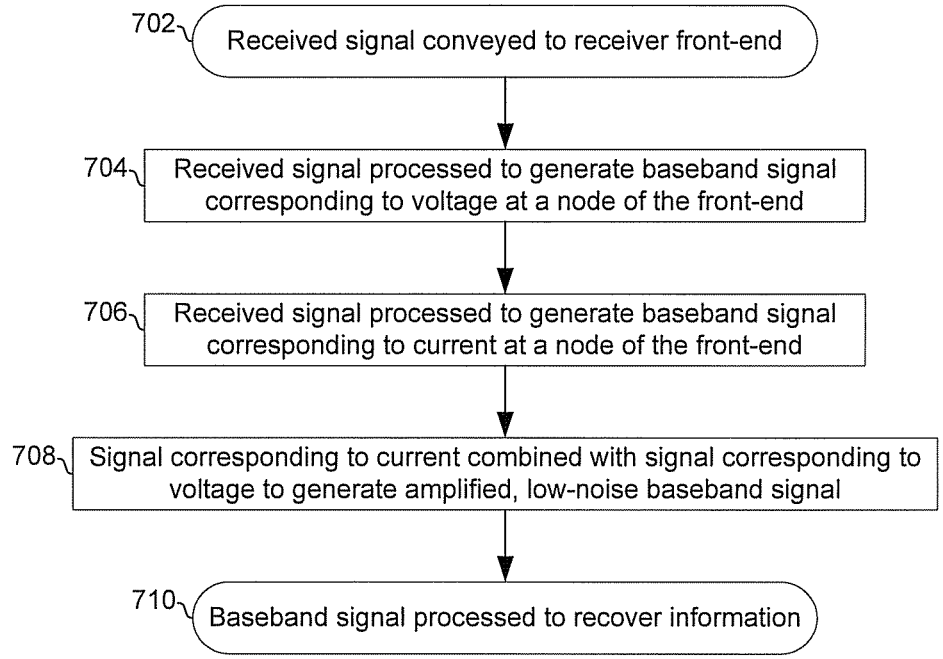
FIG. 7 is a flow chart illustrating exemplary operation of a low-noise, highly-linear receiver front-end, in accordance with an embodiment of the invention.

FIG. 7 is a flow chart illustrating exemplary operation of a low-noise, highly-linear receiver front-end, in accordance with an embodiment of the invention. Referring to FIG. 7, the exemplary steps may begin with step 702, when a signal received via the antenna 102 is conveyed to the front-end 104. In step 704, the received signal may be processed to generate a baseband signal corresponding to a voltage at the node 205 of the front-end 104. In step 706, the received signal may be processed to generate a baseband signal corresponding to current at the node 205 of the front-end. Steps 704 and step 706 may occur concurrently. The signal generated in step 704 may be combined with the signal generated in step 706 resulting in an amplified, low-noise baseband signal. In step 710, the amplified, low-noise baseband signal generated in step 708 may be processed to recover information contained in the received signal.

Various aspects of a method and system for a low-noise, highly-linear receiver front-end are provided. In an exemplary embodiment of the invention, a received signal may be processed via one or more transconductances 202, one or more TIAs 206, and one or more mixers M to generate a first baseband signal corresponding to a voltage at a node 205 of the receiver 100, and a second baseband signal corresponding to a current at node 205 of the receiver 100. The first signal and the second signal may be processed to recover information from the received signal. The first signal may be generated via a first one or more signal paths of the receiver 100 and the second signal may be generated via a second one or more signal paths of the receiver 100.

The first signal path may comprise the one or more transconductances 202, at least a portion of the one or more mixers M, and at least a portion of the one or more TIAs 206. The second signal path may comprise at least a portion of the one or more mixers M and at least a portion of the one or more TIAs 206. The received signal at the node 205 may be input to the one or more transconductances 202. An output of the one or more transconductances 202 may be input to the portion of the one or more mixers M of the first signal path. An output of each of the portion of the one or more mixers M of the first signal path may be input to the portion of the one or more TIAs 206 of the first signal path. The received signal at the node 205 may be input to the portion of the one or more mixers M of the second signal path. An output of each of the portion of the one or more mixers M of the second signal path may be input to the portion of the one or more TIAs 206 of the second signal path.

The first signal path may comprise a first capacitor 205, at least a portion of the one or more mixers M and the one or more transconductances 202. The second signal path may comprise a second capacitor 504, at least a portion of the one or more mixers M, and the one or more TIAs 206. The received signal at the node 205 may be coupled to a first terminal of the first capacitor 502. A second terminal of the first capacitor 502 may be coupled to an input of the portion of the one or more mixers M of the first signal path. An output of each of the portion of the one or more mixers M of the first signal path may be input to the one or more transconductances 202. The received signal at the node may be coupled to a first terminal of the second capacitor 504. A second terminal of the second capacitor 504 may be coupled to an input of the portion of the one or more mixers M of the second signal path. An output of each of the portion of the one or more mixers M of the second signal path may be input to the one or more TIAs 206.

The first signal path may comprise a first portion of the one or more transconductances, transconductances 602, for example, a first portion of the one of the one or more mixers M, and a first portion of the one or more TIAs 206. The second signal path may comprise a second portion of the one or more transconductances, transconductances 604, for example, a second portion of the one or more mixers M, and a second portion of the one or more TIAs 206. An architecture of the first portion of the one or more transconductances may be different than an architecture of the second portion of the one or more transconductances. The received signal at the node 205 may be input to each of the one or more transconductances 602 and 604. An output of each of the transconductances 602 and 604 may be input to one of the one or more mixers M. An output of each of the one or more mixers M may be input to one of the one or more TIAs 206.

The received signal at the node 205 may be input to the one or more mixers M. An output of each of the one or more mixers M may be input to the one or more transconductances 202. An output of each of the one or more mixers M may be input to a first portion of the one or more TIAs, such as TIAs 406 of FIG. 4. An output of each of the transconductances may be input to a second portion of the one or more TIAs, such as TIAs 206 of FIG. 4.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for a low-noise, highly-linear receiver front-end.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:
1. A method, comprising:
in a radio frequency (RF) receiver, processing a received RF signal to generate:
a first baseband signal corresponding to a voltage at a node of the RF receiver; and
a second baseband signal corresponding to a current at the node of the RF receiver; and processing, in the RF receiver, the first baseband signal and the second baseband signal to recover information from the received RF signal.

2. The method of claim 1, wherein the processing includes combining the first baseband signal and the second baseband signal to generate an output baseband signal.

3. The method of claim 1, wherein generating the first baseband signal comprises:
   converting the voltage at the node to a second current using a transconductance;
   mixing the second current with a local oscillator signal using a first mixer; and
   amplifying an output of the first mixer using a first transimpedance amplifier.

4. The method of claim 3, wherein generating the second baseband signal comprises:
   mixing the RF signal with a second local oscillator signal using a second mixer; and
   amplifying an output of the second mixer using a second transimpedance amplifier.

5. The method of claim 4, wherein the first transimpedance amplifier includes a first feedback resistance and the second transimpedance amplifier includes a second feedback resistance, the method further comprising dynamically adjusting the first feedback resistance or the second feedback resistance to adjust a noise figure of the RF receiver.

6. The method of claim 4, further comprising dynamically adjusting the transconductance to adjust a noise figure of the RF receiver.

\* \* \* \* \*